(12) United States Patent
Brutscher et al.

(10) Patent No.: US 9,821,390 B2
(45) Date of Patent: Nov. 21, 2017

(54) SAW BLADE WITH REDUCED MODAL FREQUENCIES IN THE OPERATING FREQUENCY RANGE

(71) Applicant: Black & Decker Inc., New Britain, CT (US)

(72) Inventors: David Brutscher, Simpsonville, KY (US); Sajid A. Roomy, Louisville, KY (US); John P. Wells, Eminence, KY (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/262,384

(22) Filed: Sep. 12, 2016

(65) Prior Publication Data

US 2017/0028488 A1 Feb. 2, 2017

Related U.S. Application Data

(63) Continuation of application No. 13/355,956, filed on Jan. 23, 2012, now Pat. No. 9,463,518.

(60) Provisional application No. 61/437,842, filed on Jan. 31, 2011.

(51) Int. Cl.
 *B23D 57/00* (2006.01)
 *B23D 61/02* (2006.01)

(52) U.S. Cl.
 CPC ......... *B23D 61/025* (2013.01); *Y10T 83/9319* (2015.04)

(58) Field of Classification Search
 CPC ........................ B23D 61/025; Y10T 83/9319

USPC .................. 83/835, 836–855, 676
See application file for complete search history.

(56) References Cited

U.S. PATENT DOCUMENTS

| | | |
|---|---|---|
| 1,919,180 A | 5/1877 | Tilton |
| 1,083,645 A | 1/1914 | Wettstein |
| 4,574,676 A | 3/1986 | Jansen-Herfeld |
| 4,776,251 A | 10/1988 | Carter, Jr. |
| 4,794,835 A | 1/1989 | Fujiyoshi |
| 5,012,792 A | 5/1991 | Kawata et al. |
| 5,182,976 A | 2/1993 | Wittkopp |
| D382,787 S | 8/1997 | Gakhar et al. |
| D383,368 S | 9/1997 | Achterberg et al. |
| 5,896,800 A | 4/1999 | Curtsinger et al. |
| 6,065,370 A | 5/2000 | Curtsinger et al. |
| D442,979 S | 5/2001 | Turner et al. |

(Continued)

FOREIGN PATENT DOCUMENTS

| | | |
|---|---|---|
| DE | 102007022001 B4 | 6/2011 |
| DE | 102012004212 A1 | 9/2013 |

(Continued)

*Primary Examiner* — Omar Flores Sanchez
(74) *Attorney, Agent, or Firm* — Scott B. Markow

(57) ABSTRACT

A saw blade is provided including a circular metal disc including a circular metal disc including a central aperture and a plurality of teeth spaced around a periphery of the circular metal disc. A first plurality of fully enclosed body slots are generally equally spaced from a center of the circular metal disc by a first distance and a second plurality of fully enclosed body slots are each disposed directly radially outward from a respective one of the first plurality of body slots. The second plurality of slots are generally equally spaced from the center of the circular metal disc by a second distance greater than the first distance. The saw blade design provides a blade with no modal frequencies in the operating frequency range.

20 Claims, 6 Drawing Sheets

(56) References Cited

U.S. PATENT DOCUMENTS

| | | |
|---|---|---|
| 6,405,575 B1 | 6/2002 | Petniunuas et al. |
| D485,478 S | 1/2004 | Sakai |
| 6,739,227 B2 | 5/2004 | Thompson |
| 7,156,010 B2 | 1/2007 | Asada |
| 7,210,474 B2 | 5/2007 | Gaida et al. |
| D587,979 S | 3/2009 | Jeiziner et al. |
| 8,042,443 B2 | 10/2011 | Nishio et al. |
| 8,347,873 B2 | 1/2013 | Baratta et al. |
| D677,290 S | 3/2013 | Brutscher et al. |
| D677,291 S | 3/2013 | Brutscher et al. |
| D703,708 S | 4/2014 | Lizzi |
| D704,754 S | 5/2014 | Lizzi |
| D745,354 S | 12/2015 | Butler |
| D745,355 S | 12/2015 | Butler |
| D745,356 S | 12/2015 | Butler |
| 2003/0056633 A1 | 3/2003 | Baron et al. |
| 2009/0199693 A1 | 8/2009 | Heyen |
| 2012/0192694 A1 | 8/2012 | Brutscher et al. |
| 2015/0266118 A1 | 9/2015 | Barbiero et al. |

FOREIGN PATENT DOCUMENTS

| | | |
|---|---|---|
| EP | 819491 A1 | 1/1998 |
| EP | 2450141 A1 | 5/2012 |
| JP | 2003340637 A1 | 12/2003 |
| WO | 8705556 A1 | 9/1987 |
| WO | 2013029857 A1 | 3/2013 |

SAW BLADE WITH REDUCED MODAL FREQUENCIES IN THE OPERATING FREQUENCY RANGE

CROSS REFERENCE TO RELATED APPLICATIONS

This application is a continuation of U.S. patent application Ser. No. 13/355,956, filed Jan. 23, 2016, and titled "Saw Blade with Reduced Modal Frequencies in the Operating Frequency Range," which claims the benefit of U.S. Provisional Application No. 61/437,842, filed on Jan. 31, 2011. The entire disclosure of the each of the above applications is incorporated herein by reference.

FIELD

The present disclosure relates to a method of designing a saw blade, and more particularly, a saw blade with reduced modal frequencies in the operating frequency range.

BACKGROUND AND SUMMARY

This section provides background information related to the present disclosure which is not necessarily prior art.

Circular saw blades are used for cutting various materials used in the construction trades. Circular saw blades have been made with various body slot designs. U.S. Pat. No. 4,776,251 discloses circumferential extending laser-cut slots. Each of the slots consists of an arc of a circle concentric with the body of the saw and parallel to the peripheral edge thereof. The slots are spaced in a manner such that each slot cools an area of the body when the saw blade is in operation.

U.S. Pat. No. 4,574,676 discloses a circular saw blade with a plurality of strain compensating slots. The slots include a number of inner slots extending outwardly from a central bore of the blade and a number of outer slots which are substantially parallel to the inner slots and respectively spaced therefrom in the radial direction and circumferential direction.

U.S. Pat. No. 3,981,216 discloses a high speed saw blade including a plurality of narrow expansion slots formed in the outer edge of the blade at a negative angle with respect to a line extending radially from the center of the blade to the slots. The slots are provided for noise reduction.

U.S. Pat. No. 5,555,788 discloses a saw blade including a plurality of radial expansion slots having a J-shape and a plurality of arced body slots. The disclosure states that the J-shape of the expansion slots seem to cause less high frequency whistle. The arced body slots are provided with two opposed sides of different radius which do not have its two ends in radial alignment on the blade to provide better stiffness.

While many saw blade body slot designs have been designed, the slots have been designed for cooling, strain compensating, expansion and stiffness purposes without consideration of the effects on vibration issues.

This section provides a general summary of the disclosure, and is not a comprehensive disclosure of its full scope or all of its features.

A saw blade is provided including a circular metal disc including a central aperture and a plurality of teeth spaced around a periphery of the circular metal disc. A first plurality of fully enclosed body slots are generally equally spaced from a center of the circular metal disc by a first distance and a second plurality of fully enclosed body slots are each disposed directly radially outward from a respective one of the first plurality of body slots. The second plurality of slots are generally equally spaced from the center of the circular metal disc by a second distance greater than the first distance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
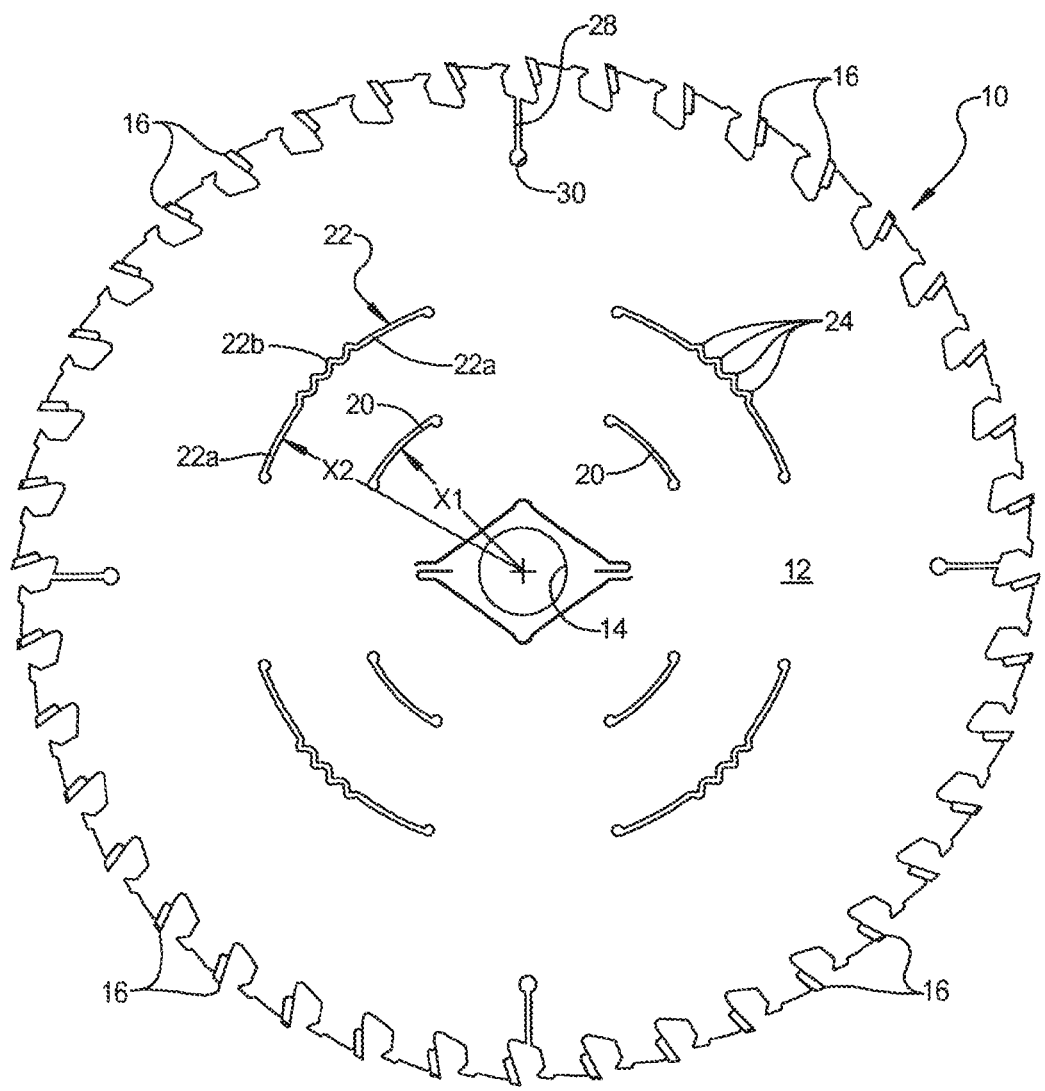
FIG. 1 is a side plan view of a saw blade design having no modal frequencies in the operating frequency range of the saw blade.
Figure 2:
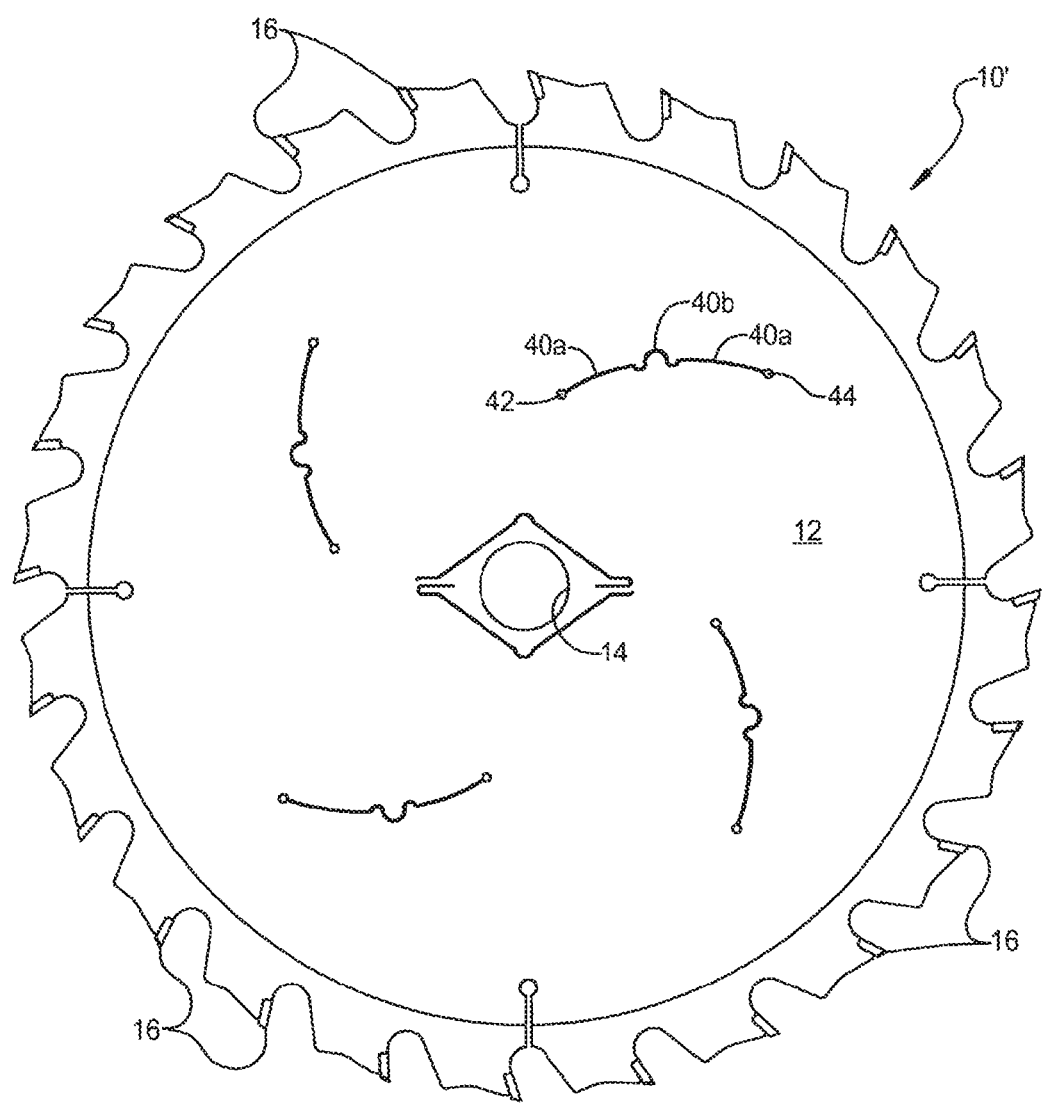
FIG. 2 is a side plan view of a saw blade design having a single modal frequency in the operating frequency range of the saw blade.
Figure 5A:
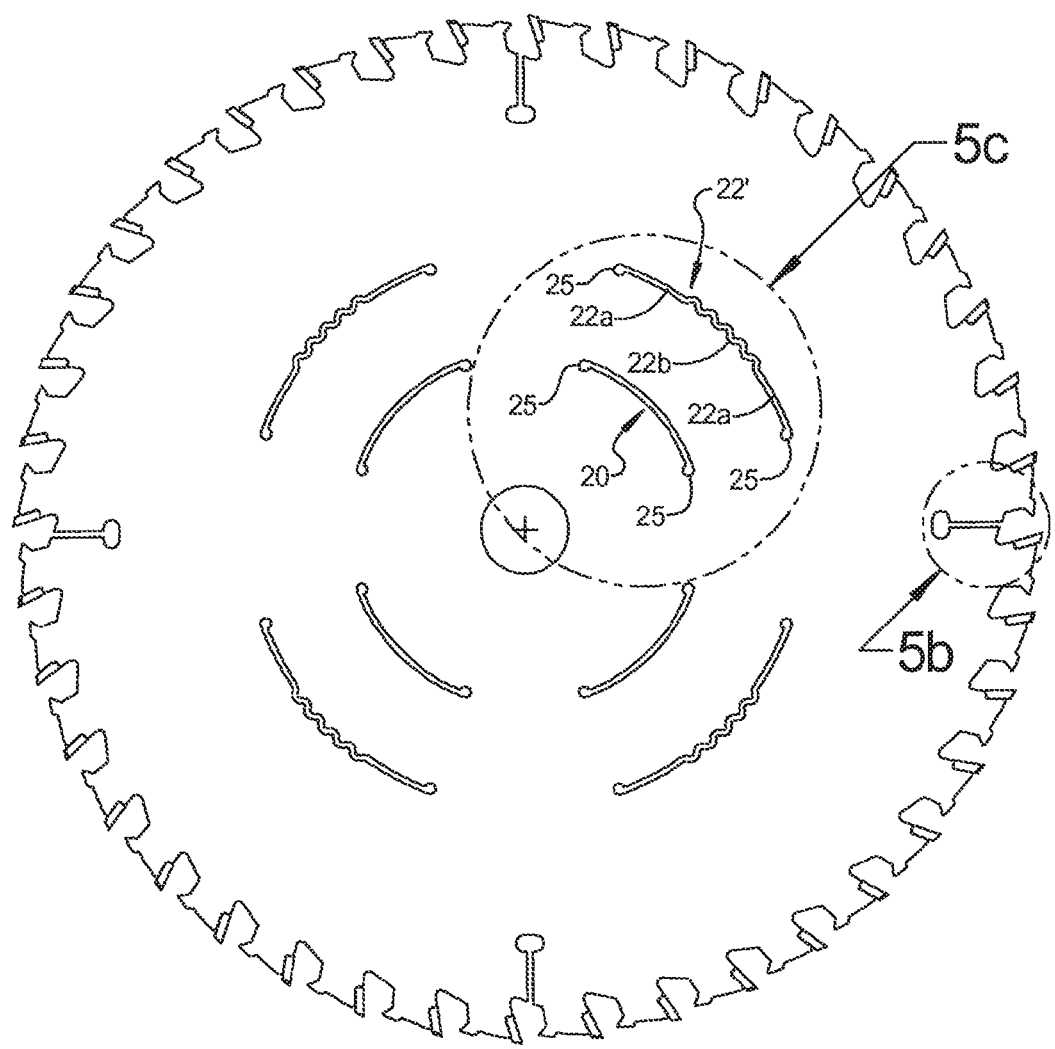
FIG. 5 $a$ is a side plan view and FIGS. 5$b$-5$c$ provide detail views of a further saw blade design according to the principles of the present disclosure.
Figure 5B:
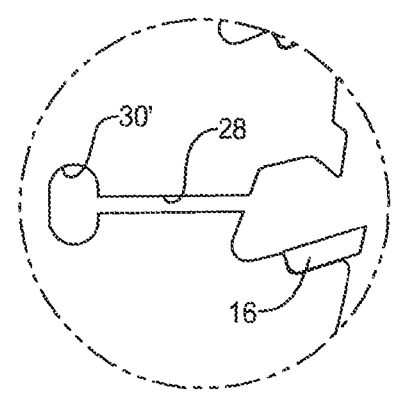
Figure 5C:
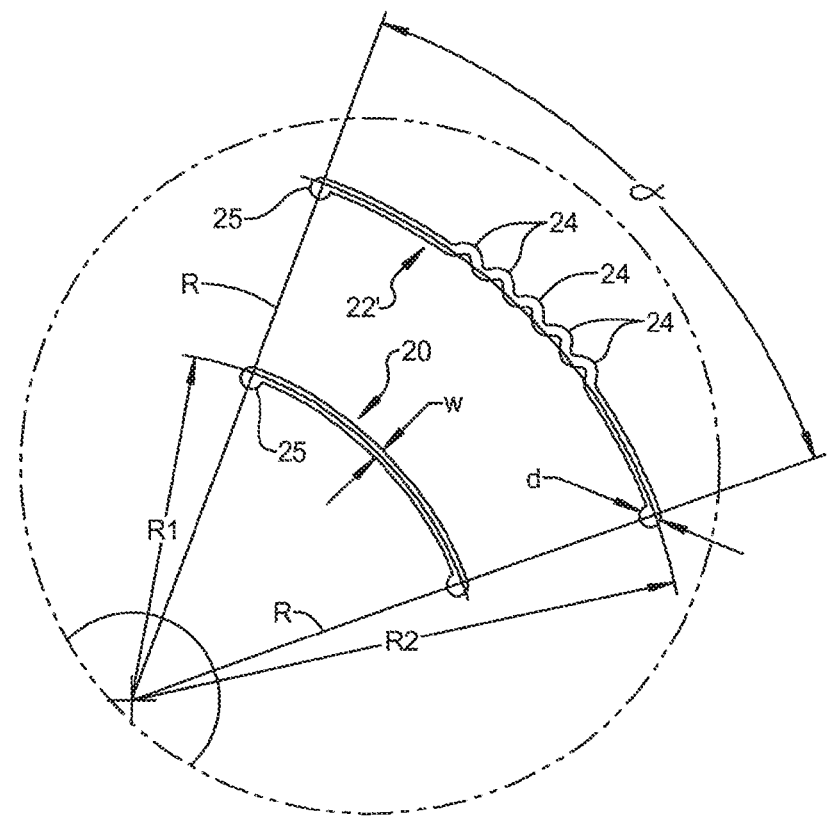

With reference to FIG. 1, the saw blade design 10 includes a circular metal disc 12 including a central aperture 14 and a plurality of teeth 16 spaced around a periphery of the circular metal disc 12. FIGS. 1, 2 and 5 are each drawn to scale so that specific size and relationship characteristics are accurately depicted. A first plurality of fully enclosed body slots 20 are each generally equally spaced from a center of the circular metal disc 15 by a distance X1 and a second plurality of fully enclosed body slots 22 are each disposed directly radially outward from a respective one of the first plurality of body slots 20. The first plurality of body slots 20 can have a width of 2 mm or less and can have a length to width ratio of between 6 and 20. The second plurality of body slots 22 are generally equally spaced from the center of the circular metal disc 12 by a second distance X2 greater than the first distance X1. Each of the second plurality of slots can have a width of 2 mm or less and can have a length to width ratio of between 30 and 70. The first and second plurality of body slots 20, 22 can each terminate in opposite end portions having a diameter that is larger than a diameter of the slots at their intermediate portions. The circular metal disc 12 includes a plurality of open-ended slots 28 extending radially inward from the periphery of the circular metal disc. The open-ended slots 28 can terminate in an inner-most portion 30 having a diameter that is larger than a diameter of the slots 28 at its outboard end. As shown in FIG. 1, the inner-most portion 30 can have a circular shape, or alternatively other shapes can be used such as an oval shape 30', as shown in the alternative embodiment of FIG. 5. The diameter of the inner most portion 30, 30' can be approximately 4-8 mm while the width of the slot 28 can be approximately 2 mm. The saw blade 10 according to the principles of the present disclosure can have a standard diameter of for example 6½, 7¼, 8¼", 10", 12" or can have an alternative diameter for use on various saws such as portable circular saws, miter saws, and table saws. The number or teeth on the saw blade can be a standard number such as 24 or 40, although other numbers of teeth can also be utilized.

The second plurality of body slots 22 each include a pair of arcuate end sections 22 *a* and an undulating intermediate section 22 *b* disposed between the arcuate end sections 22 *a*. The number of undulations 24 provided in the undulating section 22 *b* of the body slots 22 can be varied depending on a specific application. As shown in FIG. 1, the body slots 22 can include four undulations 24, while FIG. 5 shows the body slots 22' having five undulations 24. It is noted that the body slots 20 and 22 can be generally concentric about the center axis of the saw blade 10. Further, as illustrated in FIG. 5 *c*, the distal ends 25 of body slots 20, 22 can be generally circular with a diameter (d) approximately twice a width of the slots 20, 22. The distal ends 25 of the slots 20, 22 can be aligned along a common radius R, as illustrated in FIG. 5 *c*, or offset as illustrated in FIG. 1.

The slots 20, 22, as shown in FIG. 5 *c* traverse an angle of approximately 48°, although other angles can be used. The slots 20 can be approximately 54 mm (R1) from the blade center and the slots 22 can be approximately 83 mm (R2) from blade center for a 301 mm diameter (D) blade. The location of the first plurality of body slots 20 define the mean area of where all the modal frequencies will lie while the outer location of the second plurality of body slots determines how far apart the modal frequencies will be.

Figure 3:
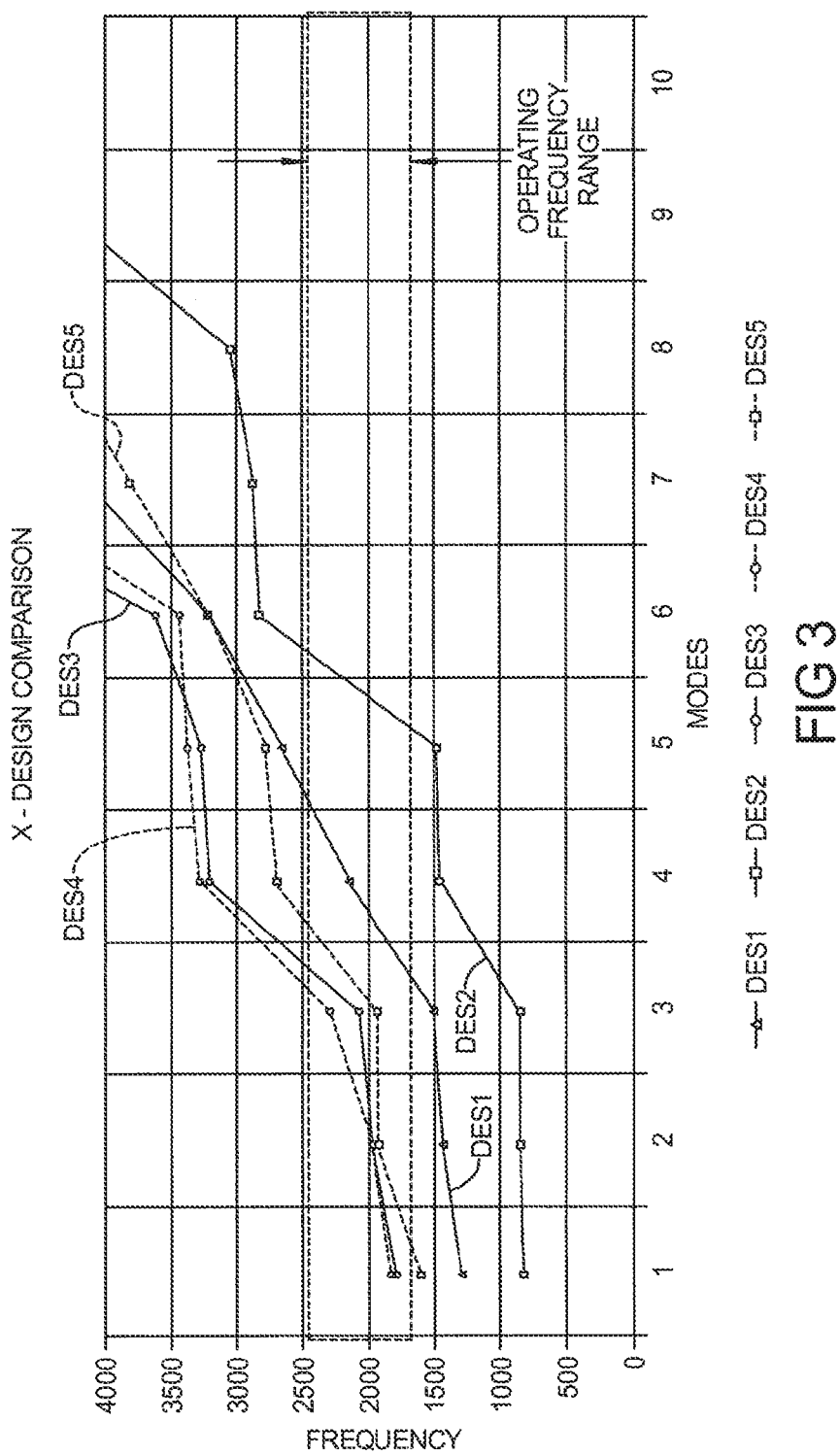
FIG. 3 is a graph showing the modal frequencies of various alternative 7¼" saw blade designs including the saw blades shown in FIGS. 1 and 2.

With reference to FIG. 2, an alternative saw blade design 10' is shown in which the body slots 40 are provided with arcuate end sections 40 *a* and an undulating intermediate section 40 *b*. FIG. 2 is drawn to scale so that specific size and relationship characteristics are accurately depicted. The body slots 40 are shown as non-concentric to the center axis of the blade with one end 42 of the body slot being located in closer proximity to the axis than the second end 44. As shown in the graph of FIG. 3, the saw blade shown in FIG. 2 is represented by the triangular data points represented by graph line DES1 in the frequency vs. mode diagram. The saw blade design as illustrated in FIG. 2 had a single modal frequency value that falls within the operating frequency range for the specific saw blade design. The presence of a single modal frequency provides a significant improvement in the characteristics of the blade as compared to the other samples DES3-DES5 which were tested and which have multiple modal frequencies within the operating frequency range.

The operating frequency range is determined by determining a minimum and a maximum operating frequency of the saw blade and includes determining a minimum and a maximum saw blade operating revolution speed and multiplying the minimum and maximum saw blade operating revolution speeds by the number of teeth on the saw blade. The minimum and maximum saw blade revolution speeds can be in units of revolutions per second. By way of example, a saw blade having a 7¼" diameter and 24 teeth can have a minimum operating speed of 4,350 revolutions per minute. That minimum operating speed converts to a minimum operating speed of 72.5 revolutions per second which can be multiplied by the number of teeth (24) to provide a minimum operating frequency of 1,740 Hz. The same saw blade has a maximum operating speed of, for example, 5,800 RPM which converts to 96.67 revolutions per second. 96.67 revolutions per second multiplied by 24 teeth provides a maximum operating frequency of 2,320 Hz. Thus, the operating frequency range of the saw blade is between 1,740 and 2,320 Hz.

The modal frequencies of the saw blade design can be identified using a solid model design of the saw blade in a software program that determines the modal frequency values of the solid model design of the saw blade. The software is an off the shelf available software that can determine the modal frequencies of solid model components and, by way of example, can include a generative part structure analysis software commercially available as a plug-in from CATIA™. Other similar solid model analysis system software can be utilized or the modal frequencies can be determined by physical testing of a prototype blade.

The results of the analysis performed for identifying the modal frequencies includes an identification of each modal frequency (for example modes 1-8) and its frequency value for the saw blade design.

By way of example, as illustrated in FIG. 3, the modal frequencies of five different saw blade sample designs were tested for determining whether the modal frequencies fall within the operating frequency range of each sample saw blade tested. It is noted that the sample DES1 test results are illustrative of the saw blade design shown in FIG. 2 while the sample DES2 test results are illustrative of the saw blade shown in FIG. 1. The test results for samples DES3-DES5 are illustrative of alternative saw blade designs having various body slot configurations. As can be seen from graph line DES1, the sample 1 test data shows one modal frequency value of 2,163.62 Hz that falls within the operating frequency range of between 1,700 and 2,450. The graph line number DES2 which is illustrative of sample DES2 shown in FIG. 1, has no modal frequencies in the operating frequency range. Therefore, the sample DES2 saw blade, shown in FIG. 1 has no significant blade vibration during the cutting operation due to the elimination of modal frequencies in the operating frequency range of the saw blade. As can be seen from graph lines DES3-DES5, the other saw blades tested have several modal frequency values within the operating frequency range and therefore these blades suffer from significant vibration during cutting which results in poor cutting feel, poor surface finish and increased cut force. These results were end user tested and confirmed. It is noted that the samples DES4 and DES 5 are commercially available saw blades and each include multiple modal frequencies in the operating frequency range. Sample DES3 is an internally designed and tested blade design that is not publicly available.

Figure 4:
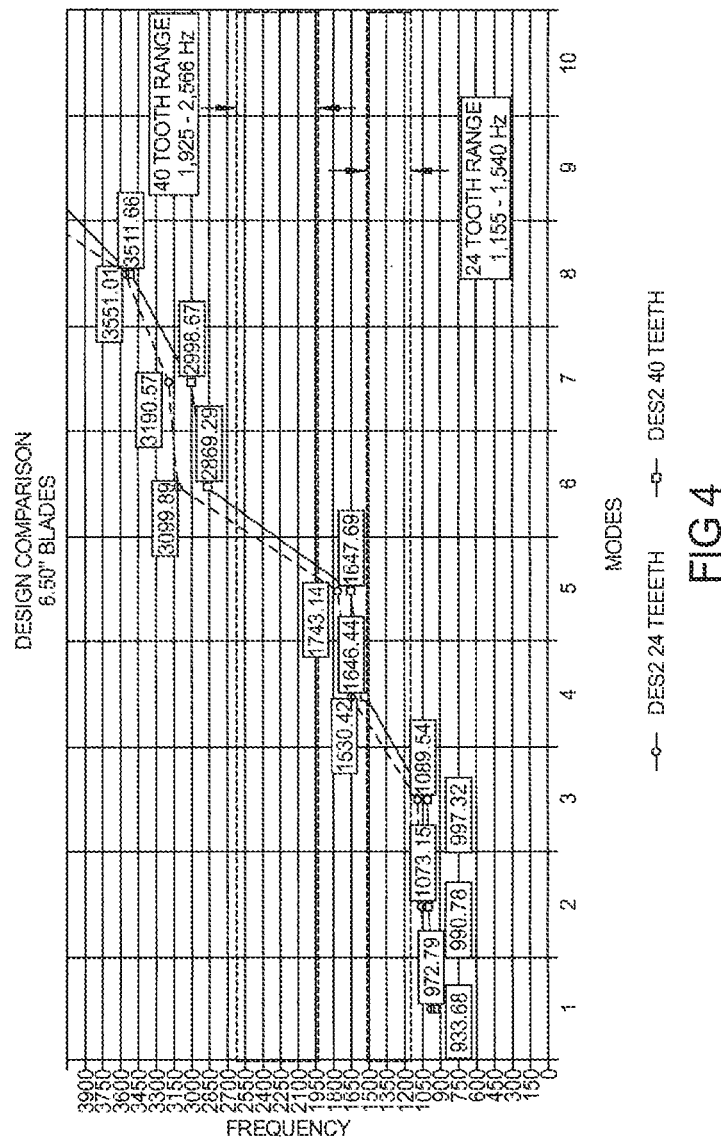
FIG. 4 is a graph showing the modal frequencies of the saw blades shown in FIGS. 1 and 2 for a 6½" diameter saw blade.

FIG. 4 illustrates test data for a 6½" blade having both 24 teeth and 40 teeth wherein the 24 tooth 6½" blade has a operating frequency range of between 1,155 and 1,540 Hz and the 40 tooth 6½" blade has an operating frequency range of between 1,925 and 2,566 Hz as illustrated in the graph of FIG. 4. The modal frequencies of the 24 tooth 6½" blade are represented by the diamond shaped data points while the modal frequencies for the 40 tooth 6½" blade are represented by the square data points in the graph of FIG. 4. Each of the 24 tooth and 40 tooth saw blades has the body slot design as illustrated in FIG. 1. On review of the data in FIG. 4, it can be seen that both the 24 tooth and 40 tooth saw blade designs include no modal frequencies in the respective operating frequency range for the saw blade.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A circular cutting blade comprising:
a circular body including a periphery and a central aperture defining a center point;
a plurality of teeth spaced around the periphery of the body;
a set of fully enclosed, arcuate, inner body slots defined in the body concentric with the center point, each inner body slot extending in a circumferential direction from a first distal end to a second distal end, where all of the inner body slots are disposed a first radial distance from the center point, and each pair of adjacent inner body slots are spaced apart by an equal circumferential distance; and
a set of fully enclosed, arcuate, outer body slots defined in the body concentric with the center point, each outer body slot extending in a circumferential direction from a third distal end to a fourth distal end, where all of the outer body slots are disposed a second radial distance from the center point that is greater than the first radial distance, and each pair of adjacent outer body slots are spaced apart by an equal circumferential distance, wherein each outer body slot is generally aligned radially with a corresponding one of the first body slots such that for each generally radially aligned outer body slot and first body slot, a radius of the body extends through a portion of the outer body slot and a portion of the first body slot.

2. The circular cutting blade of claim 1, wherein for each outer body slot and the corresponding one of the inner body slots that is aligned with the outer body slot, the first distal end lies on a first radius of the body, the second distal end lies along a second radius of the body, the third distal end lies along a third radius of the body, and the fourth distal end lies along a fourth distal end of the body, the first, second, third, and fourth radii being offset from each other.

3. The circular cutting blade of claim 2, wherein the first radius and the second radius are between the third radius and the fourth radius.

4. The circular cutting blade of claim 1, wherein for each outer body slot and the corresponding one of the inner body slots that is aligned with the outer body slot, the first distal end and the third distal end are aligned along a first common radius of the body and the second distal end and the fourth distal end are aligned along a second common radius of the body.

5. The circular cutting blade of claim 1, wherein each of the inner body slots and the outer body slots extend the same angular distance.

6. The circular cutting blade of claim 1, wherein each of the outer body slots include a pair of arcuate end sections facing toward the central aperture, and an undulating intermediate section disposed between the arcuate end sections.

7. The circular cutting blade of claim 6, wherein each undulating intermediate section includes at least four undulations.

8. The circular cutting blade of claim 1, wherein the set of inner body slots consists of four inner body slots evenly spaced circumferentially about the body and the set of outer body slots consists of four outer body slots evenly spaced circumferentially about the body.

9. The circular cutting blade of claim 1, wherein the body has a diameter of approximately 301 mm, the first radial distance is approximately 54 mm, and the second radial distance is approximately 83 mm.

10. The circular cutting blade of claim 1, wherein each of the inner and outer body slots has a width of less than 2 mm.

11. The circular cutting blade of claim 1, wherein each of the inner and outer body slots has a length to width ratio of between 30 and 70.

12. The circular cutting blade of claim 1, wherein each of the first, second, third, and fourth distal ends have a circular shape having a diameter approximately twice a width of an associated body slot.

13. A circular cutting blade comprising:
a circular body including a periphery and a central aperture defining a center point;
a plurality of teeth spaced around the periphery of the body;
a set of fully enclosed, arcuate body slots defined in the body non-concentric with the center point, each body slot having a first arcuate section extending from a first distal end of the body slot to an intermediate section of the body slot with the first arcuate section generally facing the central aperture, a second arcuate section extending from a second distal end of the body slot to the intermediate section with the second arcuate section generally facing the central aperture, and a plurality of undulations disposed in the intermediate section, wherein the body slots are evenly spaced circumferentially and radially about the body.

14. The circular cutting blade of claim 13, wherein each of the body slots has a width of less than 2 mm.

15. The circular cutting blade of claim 13, wherein each of the body slots has a length to width ratio of between 30 and 70.

16. The circular cutting blade of claim 13, wherein the plurality of undulations includes at least three undulations.

17. The circular cutting blade of claim 13, wherein each of the first and second distal ends has a circular shape having a diameter approximately twice a width of an associated body slot.

18. The circular cutting blade of claim 13, wherein each of the first distal ends of the body slots is spaced from the center axis by a first radial distance and each of the second distal ends of the body slots is spaced from the center axis by a second radial distance that is greater than the first radial distance.

19. A circular cutting blade comprising:
a circular body including a periphery and a central aperture defining a center point;
a plurality of teeth spaced around the periphery of the body;
a set of fully enclosed, arcuate, inner body slots defined in the body, concentric with the center point, each inner body slot extending in a circumferential direction from a first distal end to a second distal, where all of the inner body slots are disposed a first radial distance from the center point, and each pair of adjacent inner body slots are spaced apart by an equal circumferential distance, the set of inner body slots including a first inner body slot disposed between a 12 o'clock position and a 3 o'clock position, a second inner body slot disposed between the 3 o'clock position and a 6 o'clock position, a third inner body slot disposed between the 6 o'clock position and a 9 o'clock position, and a fourth inner body slot disposed between the 9 o'clock position and a 12 o'clock position; and a set of fully enclosed, arcuate, outer body slots defined in the body, concentric with the center point, each outer body slot extending in a circumferential direction from a third distal end to a fourth distal, where all of the outer slots are disposed a second radial distance from the center point that is greater than the first radial distance, and each pair of adjacent outer slots are spaced apart by an equal circumferential distance, wherein each outer body slot is generally aligned radially with a corresponding one of the inner body slots, the set of outer body slots including a first outer body slot disposed between a 12 o'clock position and a 3 o'clock position, a second outer body slot disposed between the 3 o'clock position and a 6 o'clock position, a third outer body slot disposed between the 6 o'clock position and a 9 o'clock position, and a fourth outer body slot disposed between the 9 o'clock position and a 12 o'clock position.

20. The circular cutting blade of claim 19, wherein each of the outer body slots includes a pair of arcuate end sections facing toward the central aperture, and an undulating intermediate section disposed between the arcuate end sections.

\* \* \* \* \*